(12) United States Patent
Yamamoto (10) Patent No.: US 6,633,346 B1
(45) Date of Patent: Oct. 14, 2003

(54) PROJECTION TELEVISION (75) Inventor: Zenkou Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/449,557

(22) Filed: Nov. 29, 1999

(30) Foreign Application Priority Data

Feb. 4, 1999 (JP) ............................................ 11-027379

(51) Int. Cl.$^7$ .............................. H04N 5/64; H04N 9/31
(52) U.S. Cl. ...................... 348/744; 348/787; 348/789
(58) Field of Search .................................. 348/744, 750, 348/751, 756, 757, 759, 761, 787, 788, 789; 353/79; 359/457

(56) References Cited

U.S. PATENT DOCUMENTS

| | | | | |
|---|---|---|---|---|
| 3,976,837 A | * | 8/1976 | Lang | 348/832 |
| 4,202,015 A | * | 5/1980 | Udo et al. | 348/789 |
| 4,323,926 A | * | 4/1982 | Newman | 348/787 |
| 4,452,509 A | * | 6/1984 | VanBreemen | 359/457 |
| 4,842,402 A | * | 6/1989 | Wise | 353/79 |
| 5,276,524 A | * | 1/1994 | Inoue et al. | 348/778 |
| 5,289,287 A | * | 2/1994 | Dargis et al. | 348/789 |
| 5,966,696 A | * | 10/1999 | Giraud | 705/14 |
| 5,999,232 A | * | 12/1999 | Kepley, Jr. et al. | 348/789 |
| 6,072,545 A | * | 6/2000 | Gribschaw et al. | 348/756 |

FOREIGN PATENT DOCUMENTS

| | | | | |
|---|---|---|---|---|
| JP | 61- 53743 | | 4/1986 | |
| JP | 3-17689 | * | 1/1991 | |
| JP | 6-225245 | * | 8/1994 | |
| JP | 06-225245 | * | 12/1994 | ............ H04N/5/64 |
| JP | 8-289230 | * | 11/1996 | |

\* cited by examiner

*Primary Examiner*—John Miller
*Assistant Examiner*—Trang U. Tran
(74) *Attorney, Agent, or Firm*—Birch, Stewart, Kolasch & Birch, LLP (57) ABSTRACT A projection television has a screen that can be oriented toward the viewer. An image-projecting device produces an enlarged video image. A reflecting mirror reflects the enlarged image to the screen from behind such that the image is focused on the screen. A casing houses the screen, the image-projecting device, the reflecting mirror. At least one of the screen, image-projecting device, and reflecting mirror, and casing is tiltable such that the screen is oriented toward a viewer, so that the viewer is able to view the video image having a maximum luminance.

10 Claims, 7 Drawing Sheets

PROJECTION TELEVISION

BACKGROUND OF THE INVENTION

1. Field of the Invention

The present invention relates to a projection television including a screen, a reflecting mirror and an image-projecting device, and particularly to a projection television in which a viewer can view a projected image with maximum luminance.

2. Description of the Related Art

Figure 7:
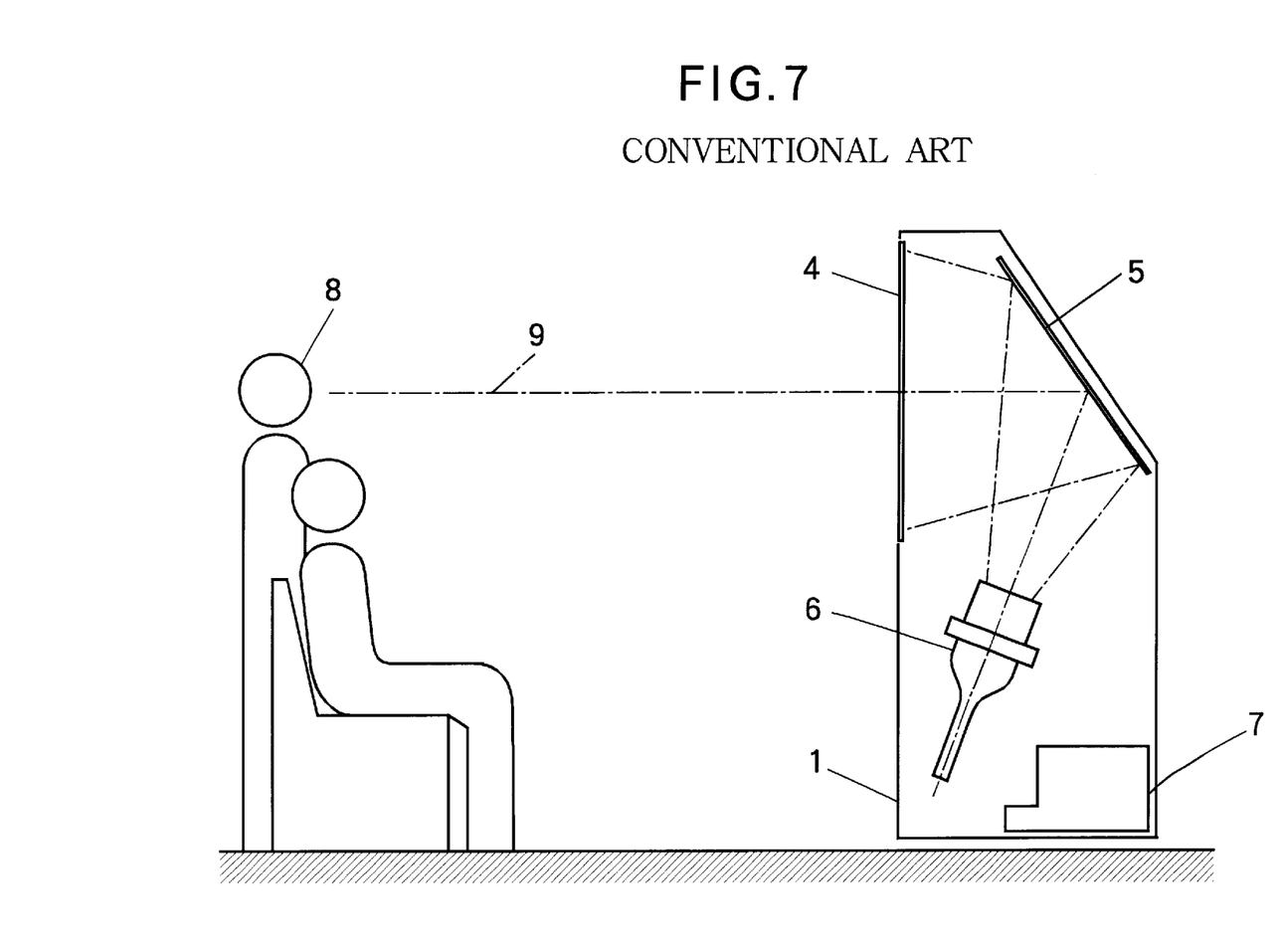
FIG. 7 is a cross-sectional side view of a conventional projection television.

FIG. 7 is a cross-sectional side view of a conventional projection television. Referring to FIG. 7, there is shown a casing 1, a screen 4 fixed to the casing 1, a reflecting mirror 5 disposed behind the screen 4 in the casing 1, and an image-projecting device 6 disposed at a lower part in the casing 1. The projection television incorporates three CRTs R, G, and B (FIG. 7 shows only one CRT). A circuit 7 supplies a video signal to the image-projecting device 6.

The image-projecting device 6 displays an image on, for example, a fluorescent screen. A mirror 5 reflects the image projected by the image-projecting device 6 to the screen 4, so that an image magnified to a predetermined size is formed on the screen 4.

With the conventional projection television, the viewer observes the image with maximum luminance when the eyes of a viewer 8 are as high as an axis of image normal to the screen and passing through the screen 4. In reality, the viewer observes the image with different luminance depending on where the viewer is relative to the screen. For instance, if the screen is positioned such that the axis of image is higher than the observer's eyes, then the observer sees the image having a decreased luminance.

As described above, the problem with the conventional art is that the observer cannot view the image with maximum luminance, depending on the positions of the viewer's eyes with respect to the screen.

SUMMARY OF THE INVENTION

The present invention has been made to solve the aforementioned problem.

An object of the invention is to provide a projection television capable of projecting high-quality images over a wide range of projection angles, so that a viewer can view the images having substantially the same luminance regardless of where the viewer is relative to the projection television.

A projection television has a screen that can be oriented toward the viewer. The projection television incorporates an image-projecting device, a reflecting mirror and screen accommodated in a housing. The image-projecting device produces an enlarged video image and the reflecting mirror reflects the enlarged image to the screen from behind such that the image is focused on the screen. At least one of the screen, image-projecting device, and reflecting mirror, and casing is tiltable such that the screen is oriented toward the viewer, so that the viewer is able to view the video image having a maximum luminance.

The screen, image-projecting device, and reflecting mirror may be housed casing, and the casing may be vertically tiltably supported such that the screen is oriented toward the viewer.

The screen, image-projecting device, and reflecting mirror may be fixed in the casing, and the casing may be horizontally tiltably supported such that the screen is oriented toward the viewer.

The reflecting mirror and screen may be assembled in an integral assembly in which the reflecting mirror is fixed relative to the screen. The integral assembly and the image-projecting device may be supported such that the integral assembly and the image-projecting device are rotated simultaneously about a common shaft in opposite directions to each other.

The image-projecting device may be fixed within the casing, and the screen and the reflecting mirror are supported such that the screen and the reflecting mirror are rotated simultaneously about the shaft in the same direction. The screen is tilted through an angle twice that through which the reflecting mirror is tilted.

The projection television may include a drive source such as a motor and a remote control unit for remote-controlling the drive source.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not to limit the present invention, and wherein.

DESCRIPTION OF THE PREFERRED EMBODIMENTS

Preferred embodiments will be described in detail with reference to the accompanying drawings. To simplify the description, the same elements have been given the same reference numerals throughout the figures.

First Embodiment

Figure 1:
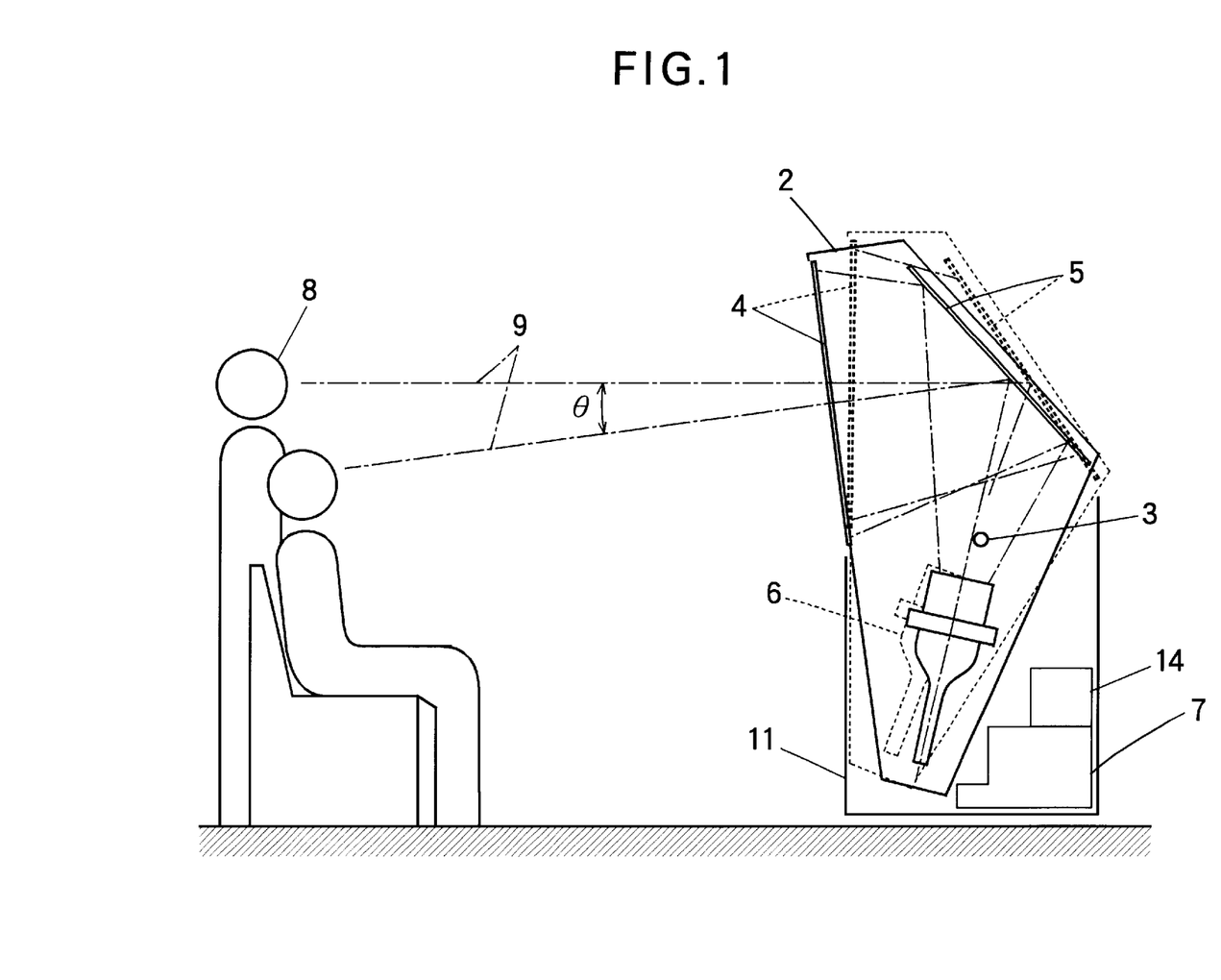
FIG. 1 is a cross-sectional side view of a first embodiment of a projection television according to the present invention.

FIG. 1 is a cross-sectional side view of a first embodiment of a projection television according to the present invention. Referring to FIG. 1, an upper casing 2 is mounted on a fixed lower casing 11. The casing 2 is securely connected to the shaft 3 so that when the shaft is rotated, the tiltable casing 2 is tilted. The casing 2 can be rotated about a shaft 3 that extends horizontally and parallel with a screen 4 fixed to the upper casing 2. The upper casing 2 may be driven to tilt relative to the lower casing 11 by an appropriate drive mechanism 14 that incorporates a power source, for example, a motor. The drive power is transmitted through a gear train, not shown, from the motor 14 to the shaft 3.

For precise, smooth tilting of the casing 2, the gear train is required to have as large a reduction ratio as possible. In particular, the final gear should have a large reduction ratio. A chain-drive type transmission mechanism having a chain and a sprocket wheel may be used in place of the gear train. Still alternatively, the casing 2 may be driven manually through an appropriate mechanism.

A reflecting mirror 5 is disposed behind the screen 4 in the upper casing 2, and a projector 6 disposed at a lower part in the casing 2. A circuit 7 is disposed in the lower casing 11 and supplies image signals to the projector 6. The circuit 7 is located at a place where the circuit 7 does not interfere with the upper casing 2 when the upper casing 2 is rotated about the shaft 3.

For example, the projection television has a screen 4 having an axis of image 9 such that when a viewer 8 stands in front of the screen 4, the line of sight of the viewer 8 is in line with the axis of image 9. In this specification, the axis of image 9 is used to cover an axis that is normal to the screen 4 and passes through the center of the screen 4.

When the upper casing 2 is at the dotted line position, the screen 4 is vertical and substantially in the same plane as the front of the lower casing 11, and the axis of image 9 extends horizontally.

When the viewer 8 views the image sitting on a chair, the upper casing 2 can be rotated about the shaft 3 by a predetermined angle θ to incline downward to the solid line position. Consequently, the axis of image 9 is tilted downward by the angle θ, so that the line of sight of the viewer sitting on the chair coincides with the axis of image 9. This ensures that the viewer 8 views the projected image having a maximum luminance.

The aforementioned tiltable casing 2 allows the viewer to view images having a maximum luminance even if the eyes of the viewer are not exactly on the axis of image 9.

The first embodiment has been described with respect to a projection television in which the projector 6 and the electrical circuit 7 are separate components. However, the invention is also applicable to an apparatus such as a CRT video projector, a liquid crystal video projector, a DLP projector, and a slide projector in which the projector 6 and the electrical circuit 7 are integrated in a single assembly.

Second Embodiment

Figure 2:
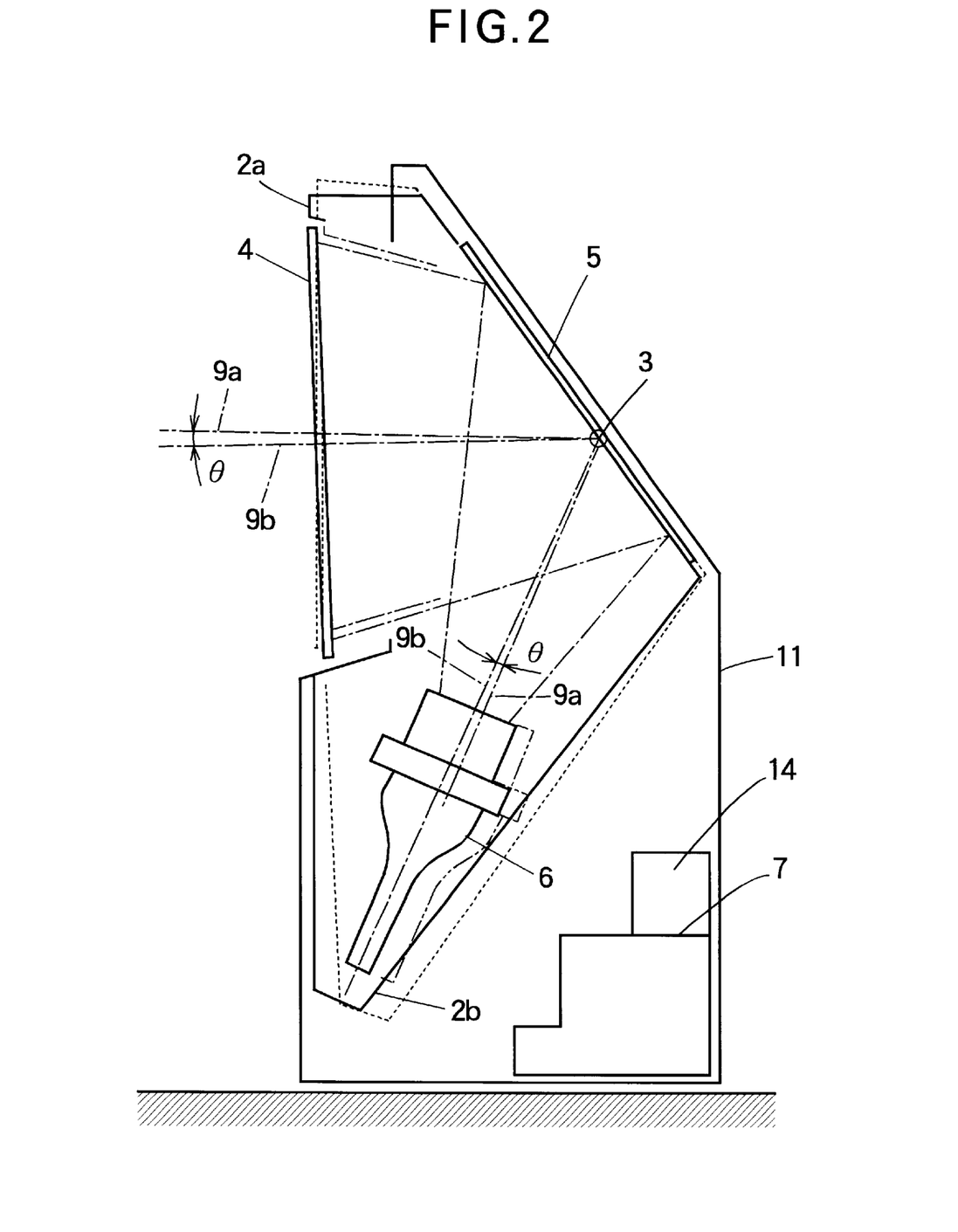
FIG. 2 is a cross-sectional side view of a second embodiment.

FIG. 2 is a cross-sectional side view of a second embodiment, illustrating the positional relationship among the projector and the surroundings.

Referring to FIG. 2, the screen 4 and reflecting mirror 5 are housed in a casing 2a and the projector 6 is housed in a casing 2b. The casings 2a and 2b are separate casings but are pivotal about the shafts 3 laterally projecting from the reflecting mirror 5. The casings 2a and 2b are pivoted drivingly in opposite directions to each other. The casings 2a and 2b may be driven to tilt by an appropriate drive mechanism 14 incorporating a power source, for example, a motor. The drive power is transmitted in a similar manner to the first embodiment. Alternatively, the casings 2a and 2b may be manually driven to tilt.

When the screen 4 and the projector 6 are at their dotted line positions and the viewer's eyes are below the axis 9a, then the casings 2a and 2b are tilted toward each together by an angle θ so that the casings 2a and 2b are at the solid line positions and the viewer's eyes are on the axis of image 9b. When the screen 4 and the projector 6 are at their solid line positions and the viewer's eyes are above the axis 9b, then the casings 2a and 2b are tilted away from each together by an angle θ so that the casings 2a and 2b are at the solid line positions and the viewer's eyes are on the axis of image 9a.

Third Embodiment

Figure 3A:
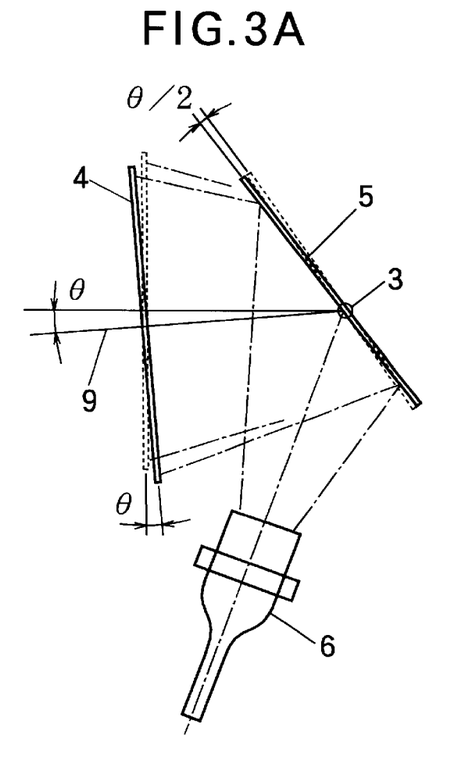
FIGS. 3A and 3B are cross-sectional side views of a third embodiment.

FIG. 3A is a sectional side view of a third embodiment, showing the positional relationship among the projector and the surroundings.

Figure 3B:
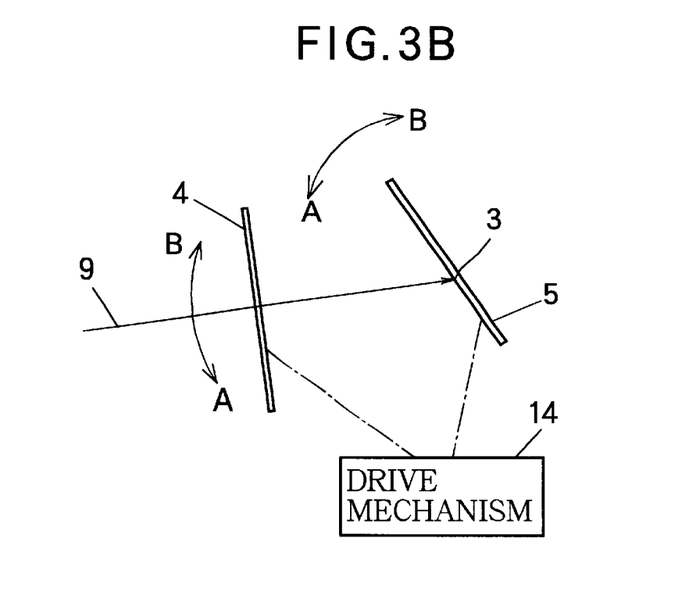

The screen 4 and the reflecting mirror 5 are tiltable while the projector 6 is fixed. The screen 4 and reflecting mirror are drivingly tilted by the drive mechanism 14 shown in FIG. 3B. Alternatively, the casing 2a and 2b may be manually driven to tilt. The screen 4 is rotated by an angle θ about the shaft 3 and the reflecting mirror 5 is rotated by an angle θ/2 about the shaft 3 in the same direction as the screen 4. Consequently, the direction of the axis of image 9 is tilted in a vertical plane by the angle θ. In order to prevent the images on the screen 4 from being disturbed, the reflecting mirror 5 and the screen 4 have to be tilted simultaneously, i.e., the reflecting mirror 5 is tilted at an angular speed half that of the screen 4.

Fourth Embodiment

Figure 4A:
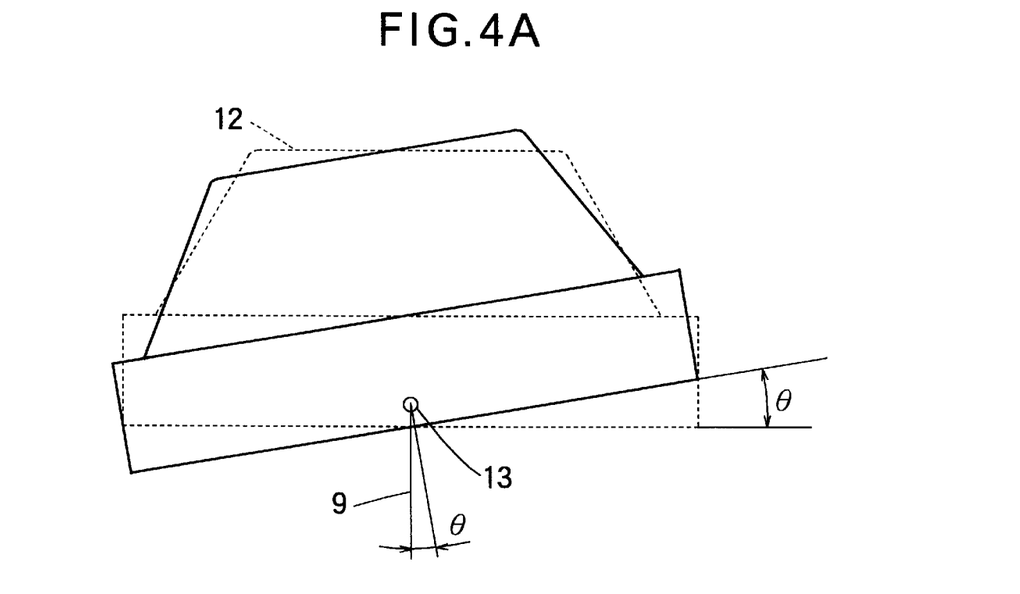
FIGS. 4A and 4B are top views of a fourth embodiment.
Figure 4B:
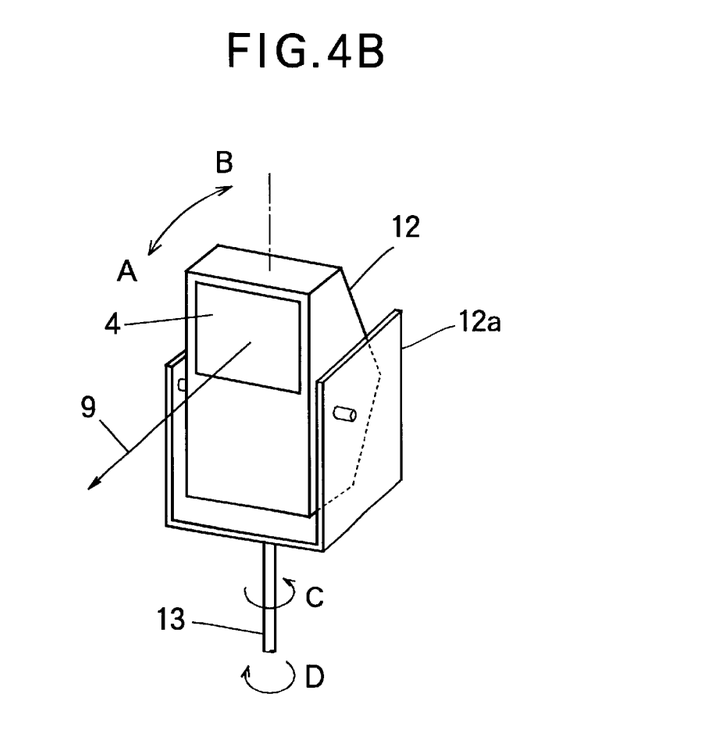

A fourth embodiment is a modification of the first embodiment. The fourth embodiment is characterized in that the casing can be rotated so that the axis of image 9 is tiltable not only in the vertical plane but also in the horizontal plane.

FIG. 4A is a top view of a projection television according to the fourth embodiment.

FIG. 4B is a perspective view of a projection television according to the fourth embodiment.

Referring to FIGS. 4A and 4B, the casing 12 is mounted on a casing 12a. The casing 12a is mounted in the stationary lower casing and can be swiveled about a shaft 13 in horizontal directions shown by arrows C and D. Other structural elements such as the projector 6 are fixedly disposed in the casing 12. The casing 12 can be driven to swivel in the horizontal plane by a drive mechanism.

The screen 4, the reflecting mirror 5, and projector 6 are fixedly disposed in the casing 12 as in the first embodiment. By controllably driving the casing 12a to swivel, the casing 12a can be swiveled by a predetermined angle θ about the rotation axis 13. Rotating the casing 12 in a horizontal plane enables the viewer to view the image with a maximum possible luminance even when the viewer is not exactly in front of the projection television but on the right or left side of the television, toward the front.

The fourth embodiment allows the axis of image 9 to be varied both in the vertical direction and in the horizontal direction. Therefore, the screen can be oriented so that the viewer who is not directly in front of the projection television can view the image with a maximum luminance.

The fourth embodiment may also be applicable to the second and third embodiments if the screen 4, the reflecting mirror 5, and projector 6 are mounted on a single casing that can be horizontally swiveled.

Fifth Embodiment

Figure 5:
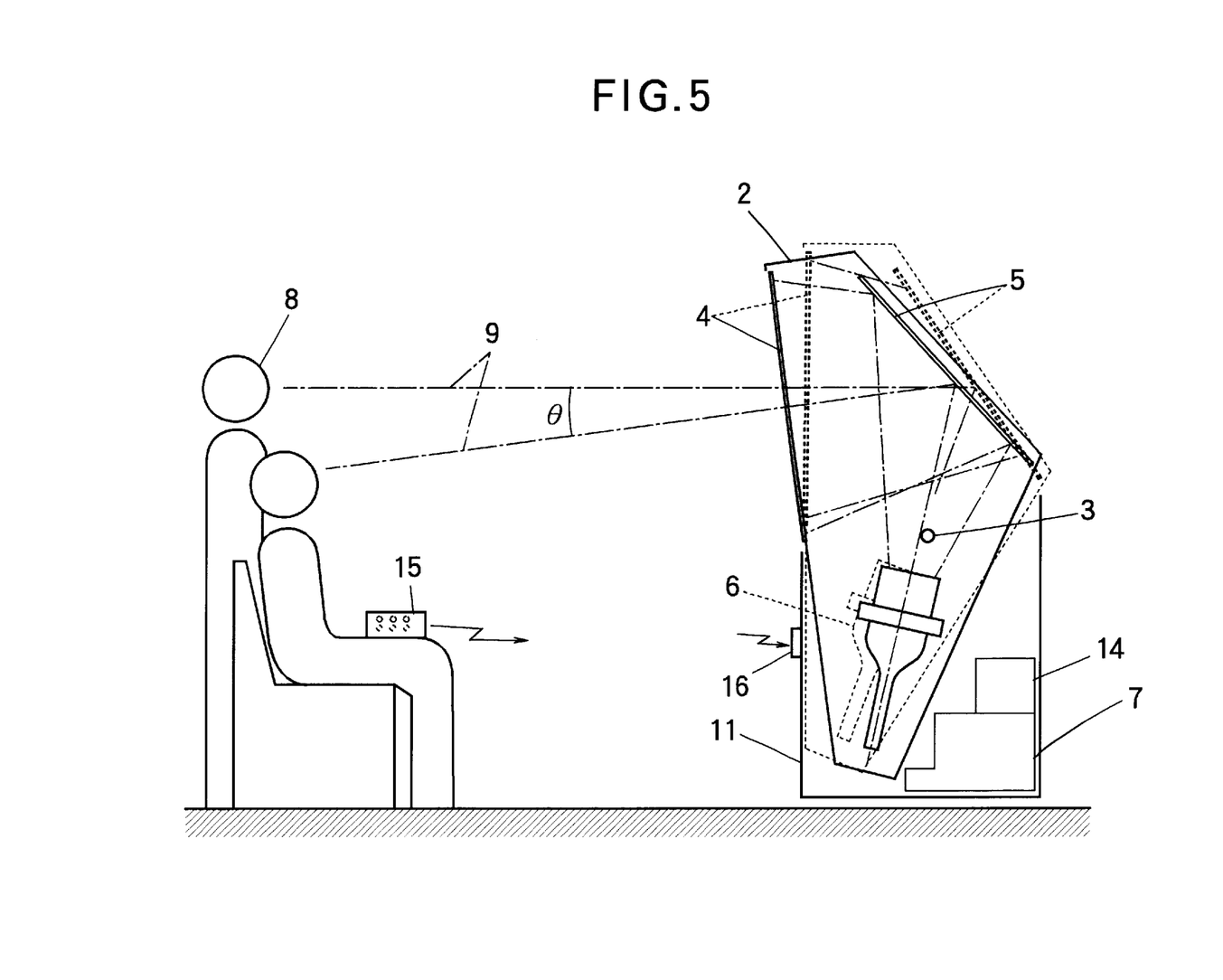
FIG. 5 is a cross-sectional side view of a fifth embodiment.

FIG. 5 illustrates an apparatus according to a fifth embodiment. Referring to FIG. 5, the projection television incorporates a receiver 16 that receives controlling signals from a wireless remote controller 15. The receiver 16 converts the controlling signals into drive signals that drive the motor 14, thereby controlling the orientation of the projection television.

The use of the remote controller 15 enables the viewer to adjust the orientation of the projection television in the vertical direction from a place remote from the projection television, so that the viewer can view the image having a maximum luminance.

Sixth Embodiment

A sixth embodiment is directed to the construction in which heat radiated by or voice uttered by the viewer is detected to find where the viewer is relative to the projection television, and the screen is oriented toward the viewer.

Figure 6:
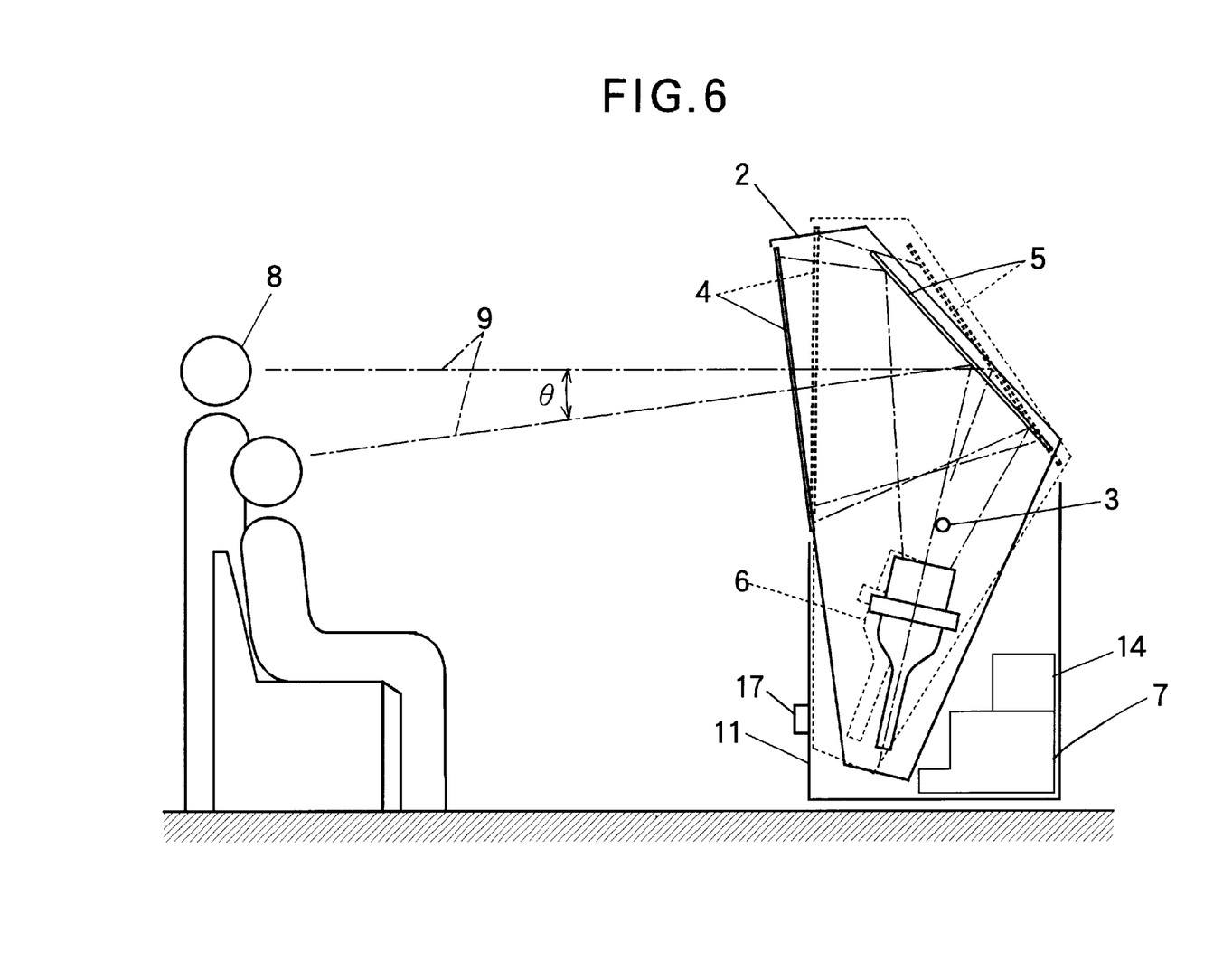
FIG. 6 is a cross-sectional side view of a sixth embodiment.

FIG. 6 shows an example of a projection television with a sensor 17 disposed 9 on the front panel of the stationary casing 11. The sensor 17 detects the heat radiated by or voice uttered by the viewer 8 and the detection output of the sensor 17 is converted into a drive signal that drives the motor 14. The motor 14 is controlled to orient the screen 4 toward the viewer 8 so that the viewer 8 can view the image having a maximum luminance.

One way of detecting the viewer's position is to use a heat detector that detects a temperature higher than a predetermined threshold temperature such as the viewer's body temperature, or detects temperatures within a predetermined range. As an alternative, a sound sensor may be used for sensing sounds having sound pressures higher than a predetermined sound pressure or within a predetermined sound pressure range, or for detecting sounds having frequencies higher than a predetermined frequency or within a predetermined frequency range.

The use of such a sensor enables to automatically adjust the orientation of the screen 4 so that the viewer is able to view the image having a maximum luminance.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A projection television comprising:

a screen;

an image-projecting device for producing an enlarged image;

a reflecting mirror for reflecting the enlarged image to said screen such that the enlarged image is focused on said screen;

a casing for housing said screen, image-projecting device and reflecting mirror therein, wherein said reflecting mirror and said screen are assembled in an integral assembly in which said reflecting mirror is fixed relative to said screen, and said integral assembly and said image-projecting device are supported such that said integral assembly and said image-projecting device are pivotal simultaneously about a common shaft in opposite directions to each other, so that said screen is oriented toward a viewer; and a drive source for tilting said casing, wherein said drive source for tilting said casing is a motor.

2. The projection television according to claim 1, wherein said screen, image-projecting device, and reflecting mirror are fixed in said casing, said casing is horizontally tiltably supported such that the screen is oriented toward the viewer.

3. The projection television according to claim 1, wherein said screen, image-projecting device, and reflecting mirror are fixed in said casing, and said casing is vertically tiltably supported such that the screen is oriented toward the viewer.

4. The projection television according to claim 1, wherein said screen is oriented so that the viewer can view an image having a maximum luminance.

5. The projection television according to claim 1, wherein said screen is oriented toward a viewer so that eyes of the viewer are substantially on an axis of image projected from said screen.

6. The projection television according to claim 1, further comprising a remote control unit for remote-controlling said drive source.

7. The projection television according to claim 6, wherein said remote control unit includes a radio transmitter that transmit a control signal and a radio receiver that receives the control signal, the transmitter being operated by the viewer at a distance from said screen and the radio receiver being incorporated in said casing.

8. A projection television comprising:

a screen;

an image-projecting device for producing an enlarged image;

a reflecting mirror for reflecting the enlarged image to said screen such that the enlarged image is focused on said screen; and a casing for housing said screen, image-projecting device and reflecting mirror therein.

9. The projection television according to claim 8, wherein said reflecting mirror is rotated at an angular speed half of that of the screen.

10. A projection television comprising:

a screen;

an image-projecting device for producing an enlarged image;

a reflecting mirror for reflecting the enlarged image to said screen such that the enlarged image is focused on said screen; and a casing for housing said screen, image-projecting device and reflecting mirror therein;

wherein said reflecting mirror and said screen are assembled in an integral assembly in which said reflecting mirror is fixed relative to said screen, and said integral assembly and said image-projecting device are supported such that said integral assembly and said image-projecting device are pivotal simultaneously about a common shaft in opposite directions to each other, so that said screen is oriented toward a viewer.

* * * * *